May 12, 1925. 1,537,276
J. J. WEIER
DETACHABLE TRACTION DEVICE FOR VEHICLE WHEELS
Filed May 31, 1924 4 Sheets-Sheet 3
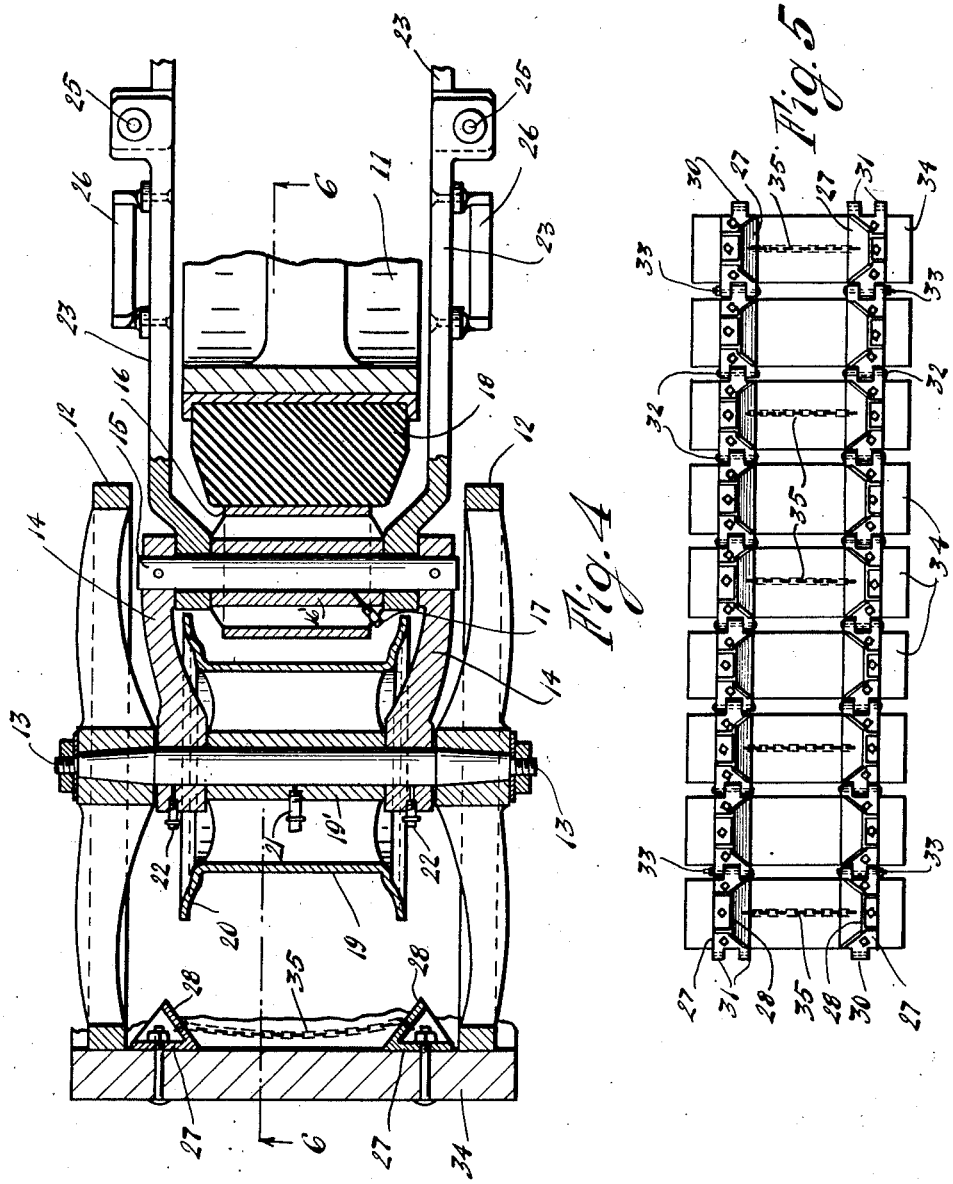

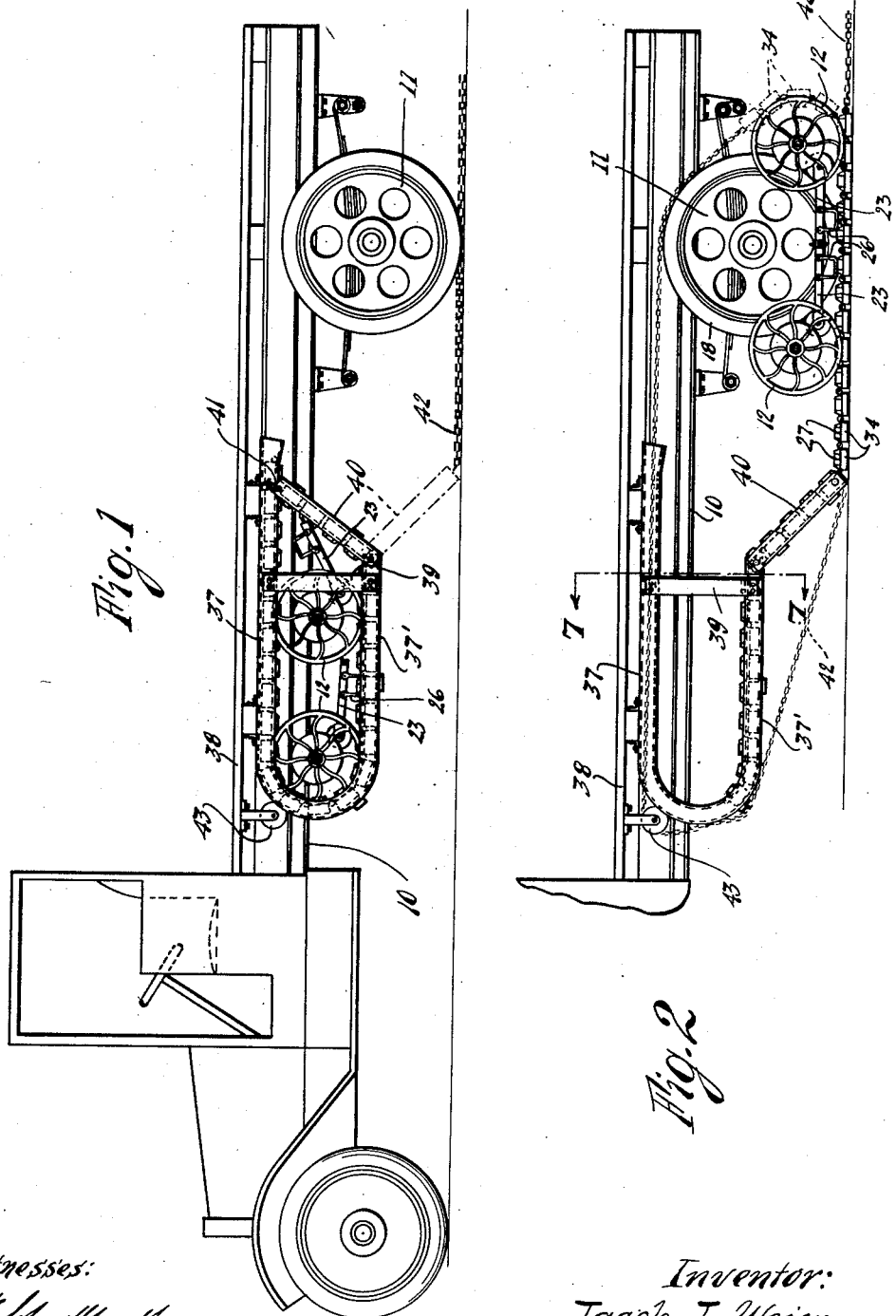

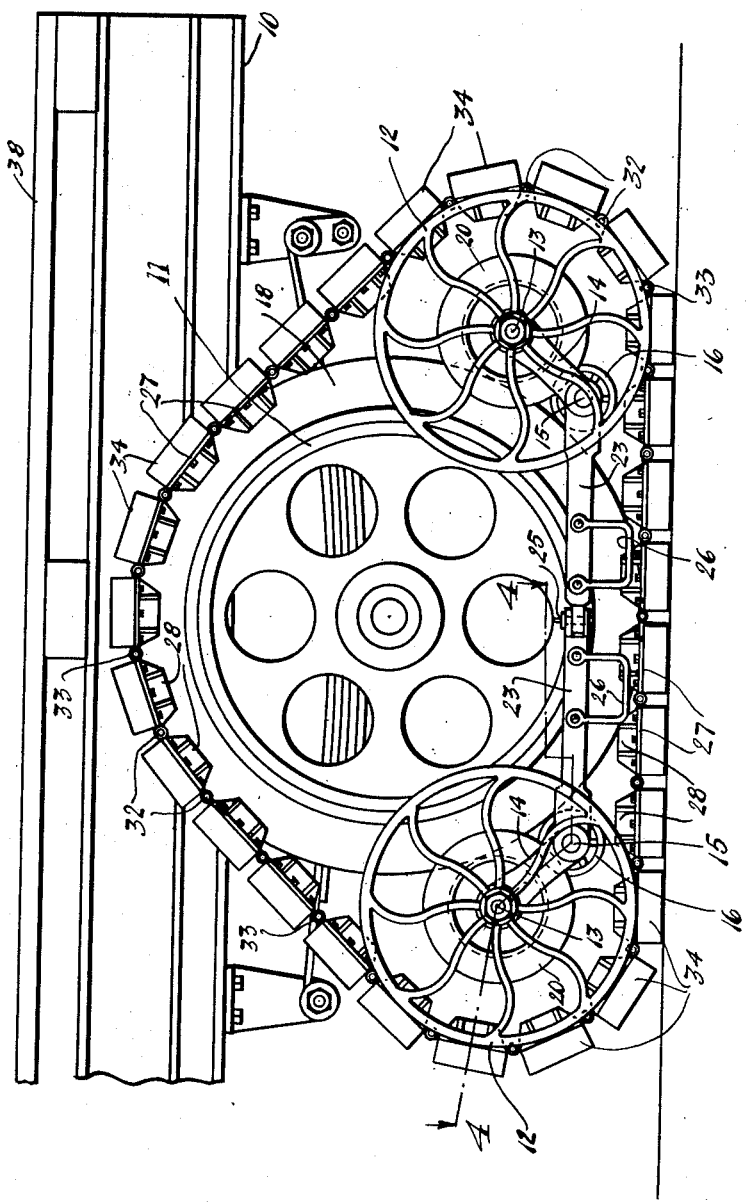

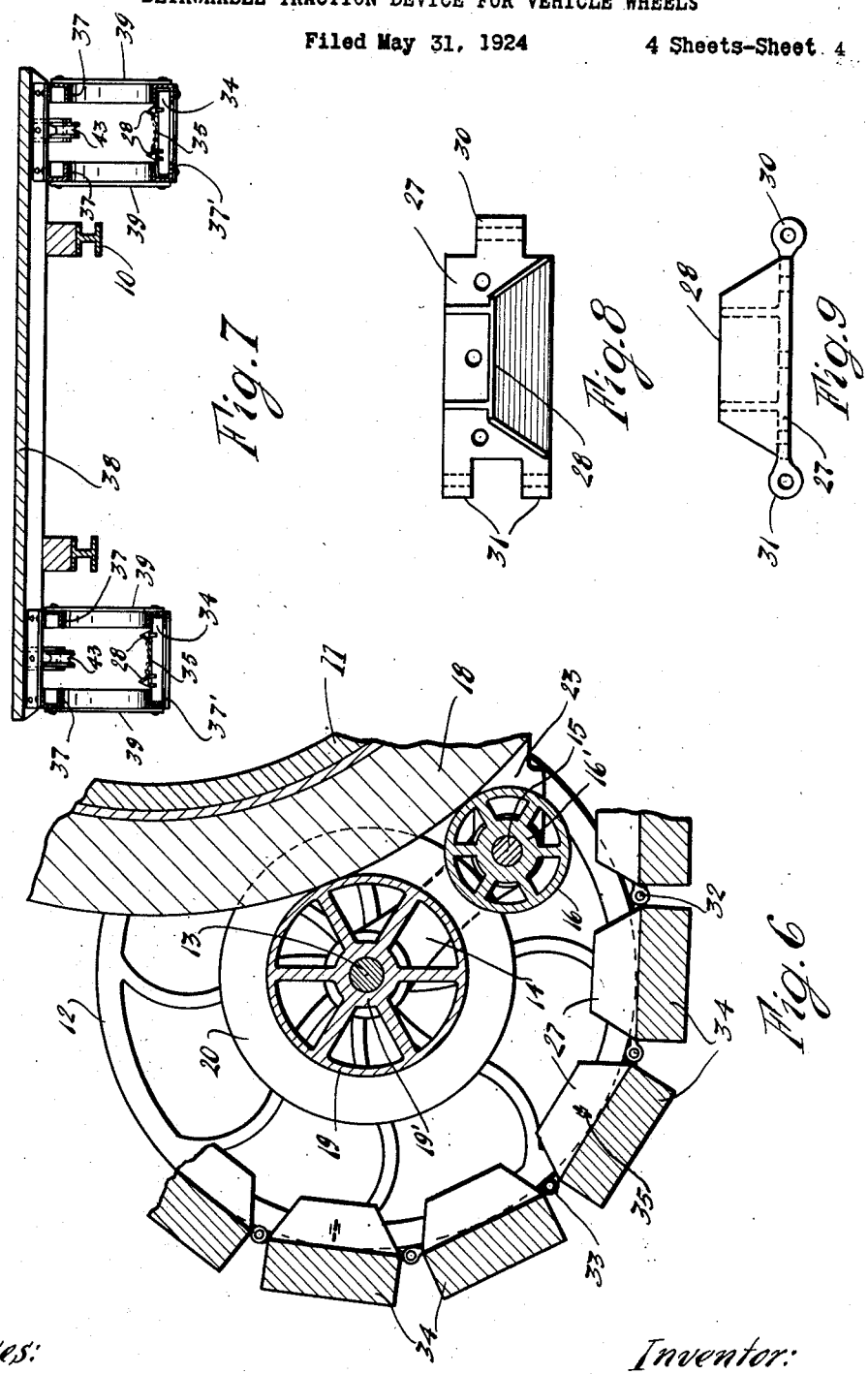

Patented May 12, 1925.

1,537,276

UNITED STATES PATENT OFFICE.

JACOB J. WEIER, OF CHICAGO, ILLINOIS.

DETACHABLE TRACTION DEVICE FOR VEHICLE WHEELS.

Application filed May 31, 1924. Serial No. 716,849.

*To all whom it may concern:*

Be it known that I, JACOB J. WEIER, a citizen of the United States, and a resident of the city of Chicago, county of Cook, and State of Illinois, have invented certain new and useful Improvements in a Detachable Traction Device for Vehicle Wheels, of which the following is a specification.

My invention pertains to a detachable traction device for vehicle wheels, and has for an object the provision of a device or means of this kind which is readily mountable on the main wheel or drive wheel of a motor vehicle, like a truck, tractor, or other machine, for driving over muddy or slippery roads or over soft ground. Another object is to provide such a device which includes sets of wheels engaged by and traveling with the main wheel or drive wheel of the vehicle, and which includes a caterpillar tread traveling around said main wheel and sets of wheels. Another object is to provide means for supporting said device under the vehicle body adjacent the main wheel, when not in use, and so arranged that the device may be readily mounted and supported therein, or may be readily removed therefrom and placed in operative position on the vehicle wheel. And another object is to provide means for drawing the traction treads, by the power of the vehicle itself, from the wheels up into the supporting means, and also from said supporting means into position on the wheels.

Other objects will appear hereinafter.

The invention consists in the combinations and arrangements of parts hereinafter described and claimed.

The invention will be best understood by reference to the accompanying drawings forming a part of this specification, and in which, Fig. 1 is a side view of a vehicle in the form of a motor truck with my invention supported in its inoperative position thereon;

Fig. 2 is a partial view of said truck, showing my wheel sets applied to the main truck wheel and the traction tread being drawn from the supporting track in position on the wheel sets and main wheel;

Fig. 3 is an enlarged view, showing my wheel sets and continuous traction tread mounted in position on the main wheel of the vehicle;

Fig. 4 is an enlarged sectional view of a wheel set, taken on line 4—4 of Fig. 3;

Fig. 5 is an inner plan view of a portion of the traction tread;

Fig. 6 is a vertical sectional view taken on line 6—6 of Fig. 4;

Fig. 7 is a vertical sectional view of the supporting track, taken on line 7—7 of Fig. 2;

Fig. 8 is a plan view of a link member of my traction tread; and

Fig. 9 is a side view of said link member.

My invention broadly includes a pair of wheel sets or sets of rotary elements, one of which is mounted in front of the main wheel, and the other is mounted at the rear of the main wheel, said sets being connected by suitable connection bars; and further includes a traction tread mounted around said wheel sets and main wheel, as best shown in Fig. 3. In addition hereto the invention further includes means for mounting and supporting this construction under the vehicle body, and means for readily moving the vehicle sets and the traction tread into the supporting means, as best shown in Fig. 1, and also out of supporting means, as best shown in Fig. 2.

In the drawings I have shown the preferred form of my invention in connection with a vehicle 10, in the form of a motor truck, and provided with a main wheel or drive wheel 11. In Fig. 1 the device is shown in inoperative position in the supporting means, while in Fig. 2 the wheel sets are shown in their operative position and the tread being automatically withdrawn from the supporting track by the forwardly moving main wheel, and in Fig. 3 the wheel sets and tread are shown in their operative position.

Each wheel set as best shown in Figs. 3 and 4 includes a pair of tread guiding or tread engaging wheels 12, one of which is mounted on each side of the rim of the main wheel 11, and which are connected by a shaft 13 and suitable nuts and washers as shown. A pair of bars 14 are mounted on the shaft 13 inward of the wheels 12 and carry shaft 15 upon which rotates a roller 16 being provided with oiling means 17 on its bearing portion 16', said roller engaging the rim or tire 18 of the main wheel 11. Between the bars 14 is mounted a guide wheel 19 to rotate on shaft 13, said wheel also engaging the tire 18 of the main wheel, and being provided with flanges 20 engaging the sides of said tire 18, oiling means 21 being mounted on the bearing portion 19' of said guide wheel, and similar oiling means 22 are provided on the bars 14. Radius bars 23 are pivotally mounted on shaft 15 between bars 14 and roller 16, and the radius bars from the front wheel set and from the rear wheel set are connected by pins 25 thus supporting the two similar wheel sets in position at the front and the rear of the main wheel, so that the traction tread engaging wheels 12 travel on the same ground level as the main wheel 11, as best shown in Fig. 3. Guide means 26, in the form of yokes extend downwardly from said bars 23 and assist in guiding the traction tread, and are also useful in supporting the bars 23 when pin 25 is removed and said bars are separated, thus preventing the free ends of these bars from falling onto the muddy ground.

The traction tread includes a plurality of link members 27 with upstanding webs 28 for guiding the wheels 11 and 12, and an ear 30 at one end to fit between a pair of lugs 31 at the opposite end of the succeeding link, ears and lugs being connected by suitable pins 32, as shown in the drawings, and at several places in the traction tread the ears 30 and lugs 31 are connected by means of bolts 33, to permit convenient separation of the ears and lugs when said traction tread is to be removed from the main wheel. These link members 27 are secured with suitable fastening means or members on blocks 34, which may be of wood or also may be made of metal plates or any suitable material. At suitable intervals chains 35 or the like are mounted across blocks 34 and connected to link members 27 (see Fig. 5) to afford traction for the tire 18 of the main wheel 11.

The means for mounting and supporting the device on the vehicle body or chassis comprises a pair of tracks 37, preferably in the form of channel bars, which are secured under the floor 38 of the vehicle body 10 in any suitable manner. Each of these track members is curved or rounded at its forward end and is extended backwardly forming the lower supporting tracks 37' in which the ends of the blocks 34 rest, suitable connecting members 39 connect the rear portions of bars 37' with 37. A gate 40, has side bars similar to the bars 37 which are pivotally mounted on the rear ends of said bars 37' and is furthermore provided with hooks 41 for fastening the free end against bars 37 as shown in Fig. 1, to retain the wheel sets and traction treads in the supporting track; said gate may also be swung downward to engage the ground and permit withdrawal of the wheel sets and traction tread, as indicated in Fig. 2.

To mount the device on the main wheel 11, the gate 40 is lowered and the companion wheel sets are removed from the tracks and set in position on the main wheel, or if desired may be set aside until the traction tread has been moved beneath said main wheel. A chain or cable 42 is then hooked or releasably attached to the lower end of the traction tread, and said chain is then placed in the path of wheel 11 and the truck with said wheel is then moved forward whereby the wheel travels over the chain and automatically pulls the traction tread down beneath the wheel 11, as indicated in Fig. 2; chain 42 is preferably of such length to bring the same over wheel 11 and forward over a pulley 43, which may be fastened on the floor 38 or may also be mounted in the track and said chain passed over it, and the lower end of this chain is then brought beneath the traction tread and travels beneath the wheel 11, and thus drawing the rear end of the tread over the wheel and into position to be fastened to the forward end of the tread, the ear 30 and lugs 31 of the end links being connected by means of a bolt 33. In moving and placing the device from its operative position around the wheel and wheel sets, into the supporting tracks, one of the bolts 33 is loosened and the chain 42 is attached to the upper free end of the tread and is then passed over roller 43 and under the forward end of said tread, and the truck is moved forward whereby the chain pulls the tread automatically by the force of such truck or vehicle up into the upper part of the supporting track; the chain may then be removed from the roller 43, if such roller is mounted on the floor instead of being mounted within the supporting track, and the traction tread may thereafter be drawn the remainder of the way into position into the track, by means of chain 42 and the moving vehicle, whereupon the wheel sets are placed within said tracks and tread, as indicated in Fig. 1. The channel bars of the tracks are so arranged that they will engage and hold the ends of the tread blocks 34; and similar tracks and similar wheel sets and treads are provided for both sides of the vehicle, as indicated in Fig. 7.

It is apparent from the above disclosure that my invention may be applied to various trucks and vehicles without materially modifying their present construction, and furthermore that the traction device may be readily moved from the supporting tracks into position on the main wheel, and may also be readily placed in said supporting tracks under the vehicle body and out of the way, by the power of the moving vehicle; and also that the tread engaging wheels 12 hold down said tread along a level with the lower point of the main wheel, and the device thus provides a maximum of traction on the ground, which is eight or more times the usual traction of the main wheel 11 by itself, as is clear from Fig. 3 of the drawings.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A traction device mountable on a vehicle wheel and comprising a set of rotary guide means with means thereon bearing on opposite sides against the tread surface of said wheel, and a continuous traction tread traveling around said guide means and wheel.

2. A traction device mountable on the main wheel of a vehicle and comprising connected tread guide wheels traveling on a level with said main wheel, means rotatably mounted on said tread guide wheels to bear on the tread surface of the main wheel, and a traction tread on which said guide wheels and main wheel travel.

3. A traction device mountable on the main wheel of a vehicle and comprising connected tread guide wheels traveling on a level with said main wheel, flanged means rotatably mounted on said tread guide wheels and embracing and bearing on the tire of the main wheel, and a traction tread traveling around said guide wheels and main wheel.

4. A traction device mountable on the main wheel of a vehicle and comprising tread guide wheels mounted at opposite sides of said main wheel, bars on said guide means, rollers mounted on said bars for engaging the periphery of said main wheel, means connecting the opposite bars and rollers, and a traction tread traveling on said guide wheels and main wheel.

5. A traction device mountable on a vehicle wheel and comprising tread engaging wheels at the front and rear of said vehicle wheel, means rotatably mounted on the tread engaging wheels and engaging said vehicle wheel, means operatively connecting said front and rear wheels, and rollers mounted on said connecting means and engaging the vehicle wheel.

6. A traction device mountable on a vehicle wheel and comprising tread engaging wheels at the front and rear of said vehicle wheel, means rotatably mounted on said tread engaging wheels and engaging the vehicle wheel, bars extending from said tread engaging wheels, rollers mounted on said bars and engaging said vehicle wheel, and detachably connected link means extending between said rollers and bars.

7. A traction device mountable on a vehicle wheel and comprising tread engaging wheels at the front and rear of said vehicle wheel, means rotatably mounted on said tread engaging wheels and engaging the vehicle wheel, bars extending from said tread engaging wheels, rollers mounted on said bars and engaging said vehicle wheel, detachably connected link means extending between said rollers and bars, and downwardly extending tread guide means and supporting means mounted on said link means.

8. A traction device mountable on the drive wheel of a motor vehicle and comprising tread guide wheels at the front and rear of said drive wheel, means mounted on said guide wheels and engaging the tread surface of said drive wheel, means operatively connecting said front and rear wheels, and a continuous traction tread traveling around said drive wheel and guide wheels.

9. A traction device mountable on the drive wheel of a motor vehicle and comprising tread guide wheels at the front and rear of said drive wheel, means rotatably mounted on said guide wheels and engaging said drive wheel, means operatively connecting said front and rear guide wheels, rollers mounted on said connecting means and engaging said drive wheel, and a continuous traction tread with detachable link elements traveling around said guide wheels and drive wheel.

10. In combination with a vehicle and its drive wheel, a traction device mountable on said drive wheel, means on said vehicle for supporting said device in its inoperative position and to permit ready mounting thereof on said drive wheel, said device comprising tread guide wheels mountable at the front and rear of said drive wheel, means rotatably mounted on said guide wheels and bearing on said drive wheel, means for operatively connecting the front and rear guide wheels, and a traction tread traveling around said guide wheels and drive wheel.

11. In combination with a vehicle and its drive wheel, a traction device mountable on said drive wheel, track means with an openable gate mounted on said vehicle for receiving and supporting said device to permit ready mounting thereof on said wheel, said device comprising tread guide wheels at the front and the rear of said drive wheel, means for operatively connecting said front and rear guide wheels, means rotatably mounted on said guide wheels for engaging the drive wheel, and a traction tread mountable around said guide wheels and drive wheel.

12. In combination with a vehicle and its drive wheel, a traction device mountable on said drive wheel, means on said vehicle for supporting said device in its inoperative position and to permit ready mounting thereof on said drive wheel, said device comprising tread guide wheels mountable at the front and rear of said drive wheel, means rotatably mounted on said guide wheels and bearing on said drive wheel, means for operatively connecting the front and rear guide wheels, a traction tread traveling around said guide wheels and drive wheel, and means for drawing said traction tread from said wheel into said supporting means by the power of the moving vehicle.

13. In combination with a vehicle and its drive wheel, a traction device mountable on said drive wheel, track means with an openable gate mounted on said vehicle for receiving and supporting said device to permit ready mounting thereof on said wheel, said device comprising tread guide wheels at the front and the rear of said drive wheel, means for operatively connecting said front and rear guide wheels, means rotatably mounted on said guide wheels for engaging the drive wheel, a traction tread mountable around said guide wheels and drive wheel, and means for moving said traction tread out of said track and around said drive wheel and guide wheels by the power of the moving vehicle.

14. In combination with a vehicle and its drive wheel, a traction device mountable on said drive wheel, track means with an openable gate mounted on said vehicle for receiving and supporting said device to permit ready mounting thereof on said wheel, said device comprising tread guide wheels at the front and the rear of said drive wheel, means for operatively connecting said front and rear guide wheels, means rotatably mounted on said guide wheels for engaging the drive wheel, a traction tread mountable around said guide wheels and drive wheel, and chain and roller means attachable to said traction tread for automatically drawing the same from said supporting track around said drive wheel and guide wheels and also from said wheels back into said track by the power of said vehicle.

15. In combination with a vehicle and its drive wheel, a traction device mountable on said drive wheel, track means mounted on said vehicle for receiving and supporting said traction device to permit ready mounting thereof on said wheel, said device comprising a wheel set at the front and at the rear of said drive wheel and means operatively connecting said wheel sets, a traction tread mountable around said drive wheel and wheel sets, and means for drawing said traction tread from said wheel into said supporting track or from said supporting track around said wheel by the power of the moving vehicle.

In testimony whereof I have signed my name to this specification in the presence of two subscribing witnesses.

JACOB J. WEIER.

Witnesses:
 JOSHUA R. H. POTTS,
 J. DANIEL STUWE.